No. 878,620.
PATENTED FEB. 11, 1908.
F. M. ENGELHARDT.
COMPUTING SCALE.
APPLICATION FILED MAY 24, 1906.
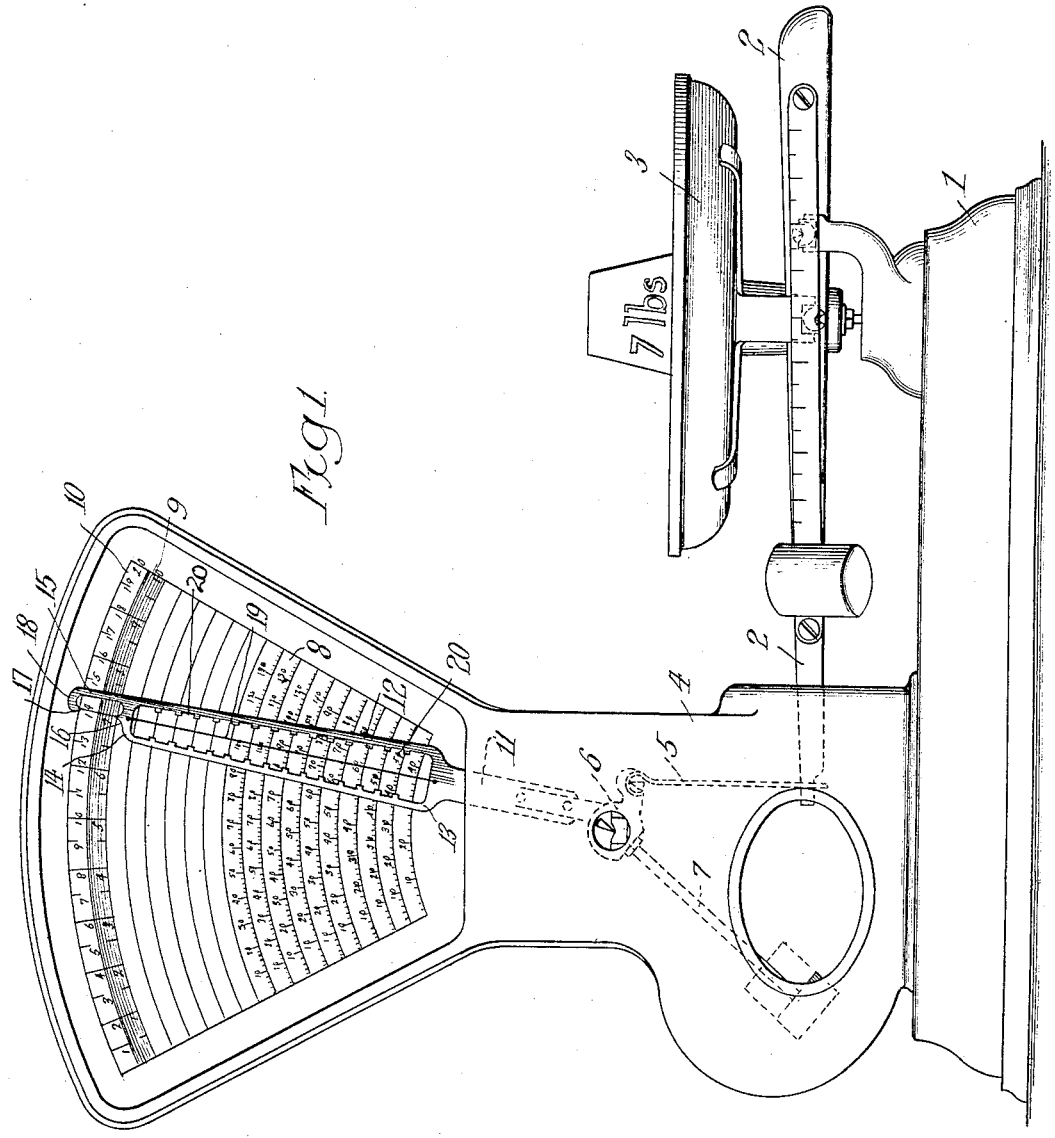
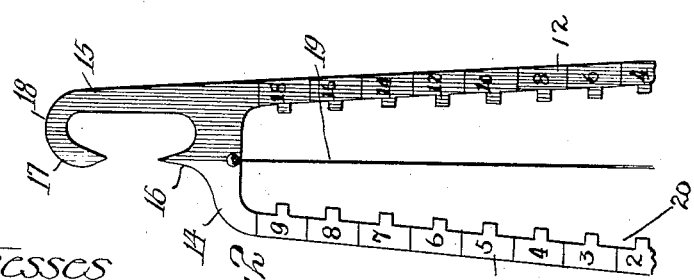
Witnesses
Edw. P. Barrett
Louis B. Erwin
Inventor
Frank M. Engelhardt
by Rector Hibben Davis
Attys

UNITED STATES PATENT OFFICE.

FRANK M. ENGELHARDT, OF CHICAGO, ILLINOIS, ASSIGNOR TO THE TOLEDO COMPUTING SCALE COMPANY, OF TOLEDO, OHIO, A CORPORATION OF NEW JERSEY.

COMPUTING-SCALE.

No. 878,620.  Specification of Letters Patent.  Patented Feb. 11, 1908.

Application filed May 24, 1906. Serial No. 318,539.

*To all whom it may concern:*

Be it known that I, FRANK M. ENGELHARDT, a citizen of the United States, residing at Chicago, in the county of Cook and State of Illinois, have invented certain new and useful Improvements in Computing-Scales, of which the following is a specification.

The type of scales to which the present invention relates is that shown in De Vilbiss Re-issue Patent No.12, 138, dated July 28, 1903. In order to increase the weighing capacity of such scales without unduly enlarging the computing chart and correspondingly increasing the swing of the pendulum and index hand, it is customary to augment the weight of the pendulum thereby increasing the resistance to the load so that the weight of the latter may be measured in the same compass as without the additional counter-balancing weight while the capacity of the scales is correspondingly increased. For the purposes of such an arrangement the chart has two rows of weight numerals, one running considerably higher than the other, generally twice as high, so that in such scales where the lesser row of numerals provides for weighing from one to five pounds the greater row provides for weighing from one to ten pounds, though the rows are practically co-extensive in length. The same computing table is employed under whichever capacity the scales may be operated, the index hand bearing two rows of price unit numerals differing according to the differences in the two capacities of the scales. Thus, if one row of these numerals runs from one to nine, the other row will run from two to eighteen, this latter row being consulted for the price unit when the scales are operating under the lesser capacity and the other row being consulted when the scales are operating under the greater weight capacity. It will be understood that the numerals of these price unit rows on the index hand register with concentric rows of computation numerals on the table or chart. It has been customary to inscribe these price unit numerals on the face of the index hand one row alongside the other, the reading of the chart or table being done from the same edge of the hand whichever row of the price unit numerals was to be consulted. Of course one row of price unit numerals would thus necessarily be further removed from said reading edge than the other and when this particular row is in use confusion is likely to result from the other row intervening between the row in use and the reading line.

Another disadvantage of the previous arrangement is that the hand casts a shadow upon the reading line under certain conditions likely to exist when the scales are in use, as when the light strikes back of the reading line. It will be understood that it is necessary to use the same reading line for both rows of price unit numerals and therefore the first mentioned difficulty cannot be overcome by using different reading lines for the different rows of such numerals. Even if this were possible the other difficulty would still exist, that is an objectionable shadow would be cast upon the chart or table making it difficult for persons with poor eyesight to properly read the computations.

To overcome the above mentioned difficulties it is proposed by the present invention to construct the index hand of two side bars spaced apart with confronting reading edges along which the rows of price unit numerals extend, and to stretch a wire midway between these reading edges, such wire supplying a fine line to mark the proper computation on the table. As the rows of computation numerals increase in distance from the center on which they are struck, the range of computations increases so that the numerals composing the rows are more numerous and closer together as the rows increase in distance from said center. The present invention provides for conforming the index hand to this feature of the table or chart so that whichever row of computation numerals is to be consulted the hand will expose sufficient of such row to enable the accurate and ready determination of the proper computation.

The invention further provides for facilitating the reading of the total weight under whichever capacity the scales are operated.

With these and incidental objects in view, the invention consists of certain novel features of construction and combinations of parts the essential elements whereof are recited in the appended claims and a preferred form of embodiment of which is described in detail hereinafter and fully illustrated in the accompanying drawings forming part of this specification.

Of said drawings, Figure 1 represents computing scales of the De Vilbiss type with the present invention embodied therein; and Fig. 2 represents a portion of the index hand detached and on an enlarged scale.

As the type of scales with which the present invention is more especially concerned has been fully set forth in said De Vilbiss patent, it will not be necessary to enter into a detailed description of the same here. It will suffice to briefly enumerate a number of the parts going to make up such scales so far as a full and complete disclosure of the present invention requires.

The reference numeral 1 designates the base of the scales above which is fulcrumed a scale beam 2 in a suitable standard and the reference numeral 3 designates the scale pan which is suitably mounted upon said scale beam to one side of its fulcrum. On the same side of this fulcrum the beam extends into a housing 4, which rises from the base 1 and within this housing the scale beam is connected by a link 5 with a pendulum fulcrum block or disk 6 from which the pendulum 7 depends so as to swing within the lower part of said housing. The upper part of the latter is fan-shaped and within it is mounted a similarly shaped table or chart of computation and weight numerals, the same comprising concentric rows 8 of computation numerals and beyond these two rows 9 and 10 of weight numerals. The outermost one of the latter will be observed to have double the weighing range of the inner row 9, which, in the present instance, has a capacity of from one to ten pounds, whereas the outer row 10 has a capacity of from one to twenty pounds.

The numerals composing the concentric rows representing computations will be observed to increase in number and to be spaced closer together as the rows increase in distance from the center on which they are struck, which center is coincident with the fulcrum point of the pendulum.

The index hand which extends over the above described chart or table comprises a shank 11 which is securely fastened to the fulcrum piece 6, and two longitudinally extending bars 12 and 13 which spring from the widened outer portion of said shank and thence extend in converging lines far enough to overlie all of the rows of computation numerals. At their outer ends these side bars 12 and 13 are united by a short cross bar 14 from one side of which extends longitudinally an arm 15 overlying the rows 9 and 10 of weight numerals. The cross bar 14 and the arm 15 are formed with pointers 16 and 17 confronting each other at the lines or graduations of the two weight rows 9 and 10 respectively, the arm 15 having a laterally curved outer end 18. From the center of the widened end of the shank 11 to the center of the outer cross bar 14 a fine wire 19 is stretched, the same alining with the pointers 16 and 17. The side bars 12 and 13 bear the two rows of price unit numerals and these side bars are preferably formed with notches 20 along their inner edges to register with the rows of computation numerals and assist in locating the particular row to be consulted according to the controlling price unit. The unit of price of course increases in the rows of numerals on the side bars as said rows extend outwardly over the chart and the price unit numerals on the bar 12, which are used under the greater weight capacity, are correspondingly less in value than the numerals in the row upon the other side bar 13.

The reading line established by the wire 19, which is midway between the price unit bearing side bars, serves for both. It will be seen that this wire cuts the rows of computation numerals and will accurately mark the particular graduation in the proper row so that the computation can be determined with nicety. It will be seen furthermore that no shadow cast by any part of the index hand under any conditions can obscure the reading line as defined by this fine wire located in the manner described. It will also be seen that no confusion can possibly arise between the two rows of price unit numerals because under the above described construction they are distinctly separated and the eye does not have to pass over either one of them to reach the reading line when the other is being used.

It is desirable that, as the index hand sweeps over the chart, no numeral in any one of the computation rows shall be passed until the next numeral is reached, for otherwise the hand might come to rest at a position where no numeral would be exposed to view within the opening of the hand in that row which would contain the proper computation. It is likewise desirable that only the computation numeral which is to be consulted shall appear within the opening at that part of the hand covering the row of numerals where the computation is to be found.

It will be seen that the converging character of the side bars 12 and 13 of the above described index hand accomplishes the desired result in this regard, the degree in which said side bars converge being regulated by the rate of increase in the numbers of computation numerals and their nearness together as the rows increase in distance from the center on which they are struck.

It will further be seen that the above described construction of the weight indicating end of the index hand provides for greatly facilitating the reading of the total weight by providing separate pointers extending in opposite directions just over the lines along which the graduations of the two rows of weight numerals extend.

Thus it will appear that the construction herein shown and described is well calculated to fulfil all of the objects primarily stated, but of course such construction is susceptible of modification without departing from the invention.

What is claimed is:

1. In computing scales of the character described, an index hand having longitudinally co-extensive price-unit side-bars which converge as they extend outwardly.

2. The combination of a chart or table made up of concentric rows of computations each row based on a different unit of price increasing the further the row from the center from which all are struck, and an index hand extending radially over said chart and having side-bars converging as the arm extends away from said center and bearing price-unit inscriptions located to correspond with said rows of computations, said chart and said index hand being relatively movable about the center from which said rows are struck and the side-bars of said hand marking out an area on said chart in which the desired computation is to be found.

3. The combination of a chart or table made up of concentric rows of computations each row based on a different unit of price increasing the further the row from the center from which all are struck; an index hand extending radially over said chart and having side-bars converging as the arm extends away from said center and bearing price-unit inscriptions located to correspond with said rows of computations, said chart and said index hand being relatively movable about the center from which said rows are struck and the side-bars of said hand marking out an area on said chart in which the desired computation is to be found; and an intervening body supplying a reading line extending between the said bars spaced from the confronting edges thereof to intersect computations on the chart so that the latter may be read from either of the confronting edges of the said index-hand bars or strips while the index-hand stands in a single position.

4. The combination of a chart or table made up of concentric rows of computations each row based on a different unit of price increasing the further the row from the center from which all are struck; an index hand extending radially over said chart and having side-bars converging as the hand extends away from said center and bearing price-unit inscriptions located to correspond with said rows of computations, said chart and said index-hand being relatively movable about the center from which said rows are struck and the side-bars of said hand marking out an area on said chart in which the desired computation is to be found; and a wire stretched midway between said side-bars to intersect the computations.

5. The combination of a chart or table made up of concentric rows of computations each row based on a different unit of price increasing the further the row from the center from which all are struck, and also having concentric rows of weight numerals located outwardly beyond the computation rows; and an index hand extending radially over said chart and having side-bars converging as the arm extends away from said center and bearing price-unit inscriptions located to correspond with said rows of computations, said hand also having pointers extending towards each other at the lines of the said rows of weight numerals respectively, and the chart and index hand being relatively movable about the center from which the rows of computation and weight numerals are struck.

6. The combination of a chart or table made up of concentric rows of computations each row based on a different unit of price increasing the further the row from the center from which all are struck, and also having concentric rows of weight numerals located outwardly beyond the computation rows; an index-hand extending radially over said chart and having side-bars converging as the arm extends away from said center and bearing price-unit inscriptions located to correspond with said rows of computations, said hand also having pointers extending towards each other at the lines of the said rows of weight numerals respectively, and the chart and index-hand being relatively movable about the center from which the rows of computation and weight numerals are struck; and an intervening body supplying a reading line extending between the said bars spaced from the confronting edges thereof to intersect computations on the chart so that the latter may be read from either of the confronting edges of the said index-hand bars or strips while the index-hand stands in a single position, said line being in alinement with the weight pointers.

7. The combination of a chart or table made up of concentric rows of computations each row based on a different unit of price increasing the further the row from the center from which all are struck, and also having concentric rows of weight numerals located outwardly beyond the computation rows; an index-hand extending radially over said chart and having side-bars converging as the arm extends away from said center and bearing price-unit inscriptions located to correspond with said rows of computations, said hand also having pointers extending towards each other at the lines of the said rows of weight numerals respectively, and the chart and index-hand being relatively movable about the center from which the rows of computation and weight numerals are struck; and a wire stretched midway between the side-bars of the hand in alinement with the weight pointers.

8. In computing scales of the character described, an index hand having weight pointers extending toward each other and spaced side bars bearing price-unit numerals; and a wire stretched midway between said side bars in alinement with the weight pointers.

9. In computing scales of the character described, the combination with a chart of computations, of an index-hand overlying the same and having confronting bars or strips spaced apart and each bearing a longitudinal series of price gradations correspondingly disposed so that the chart may be read between the bars or strips under guidance of either set of price gradations while the index-hand stands in a single position; and a wire stretched midway between said bars to intersect the computations.

FRANK M. ENGELHARDT.

Witnesses:
ALLEN DE VILBISS, Jr.,
FRANK PARKER DAVIS.